(No Model.)
D. McKENZIE, Jr.
PIPE COUPLING.
No. 349,511. Patented Sept. 21, 1886.
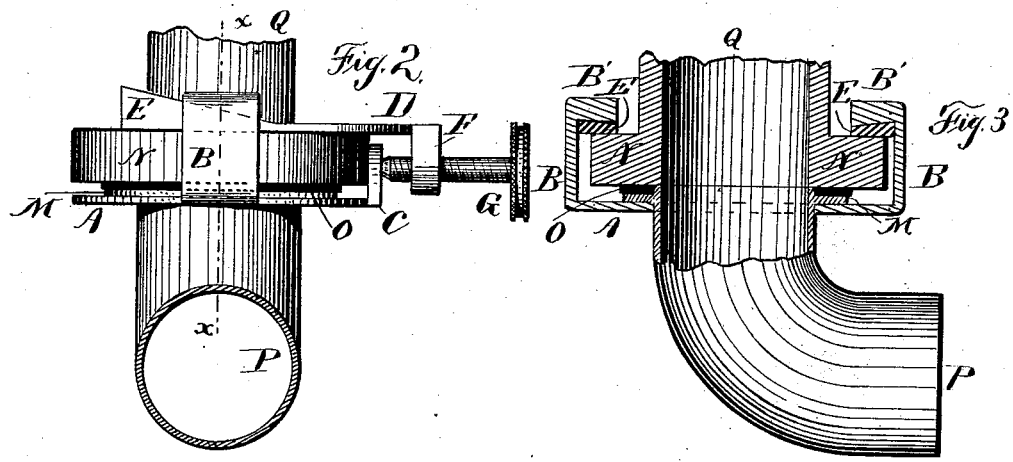
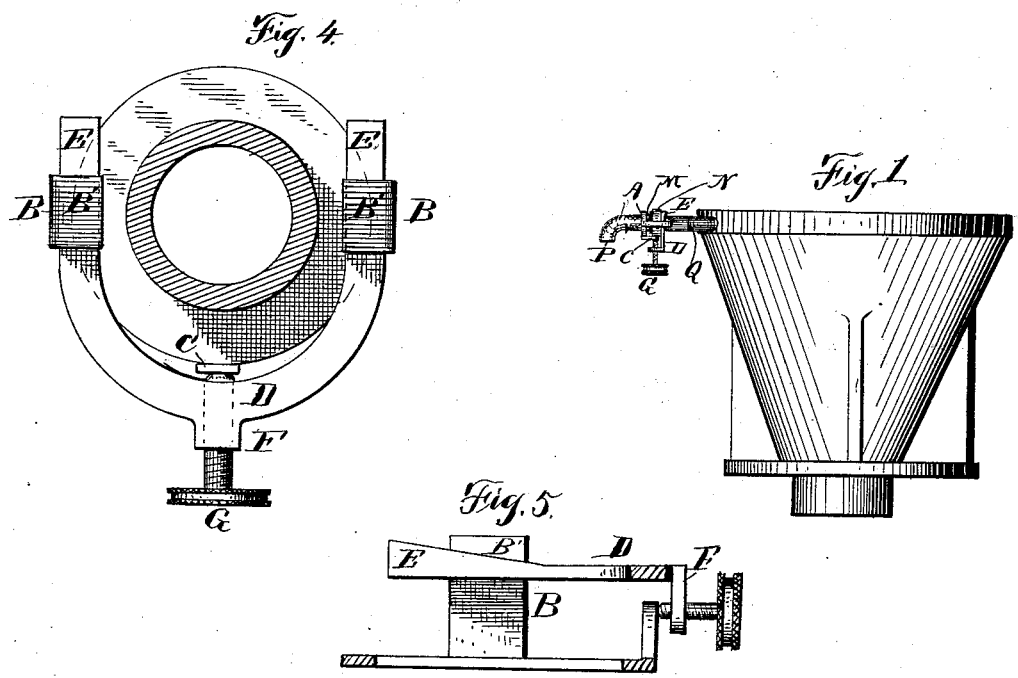
Witnesses
C. W. H. Brown,
M. L. Williams.
Inventor
David McKenzie Jr
By his Attorney
Wallace H Bartlett

UNITED STATES PATENT OFFICE.

DAVID McKENZIE, JR., OF WASHINGTON, DISTRICT OF COLUMBIA.

PIPE-COUPLING.

SPECIFICATION forming part of Letters Patent No. 349,511, dated September 21, 1886.

Application filed January 11, 1886. Serial No. 188,228. (No model.)

*To all whom it may concern:*

Be it known that I, DAVID McKENZIE, Jr., residing at Washington, in the District of Columbia, have invented certain new and useful Improvements in Pipe-Couplings, of which the following is a specification, reference being had therein to the accompanying drawings.

This invention relates to pipe-couplings, especially such couplings as are used to connect the service-pipe with the bowl or basin of a closet, or with a bath tub or tank; but the coupling may be used to connect any two flanged tubes or a tube and flanged cover together.

The invention consists in a socket having wedge-shaped protuberances, which embraces one flange of the pipe to be coupled, and a wedge-piece engaging such protuberances and bearing against the flange of the other pipe; also, in the mechanism for tightening the wedges; also, in the construction of the parts and their combination with each other and with the pipes to be coupled, as will be hereinafter pointed out and claimed.

In the drawings, Figure 1 represents the bowl of a water-closet with my coupling attached. Fig. 2 is an elevation of the coupling attached to broken sections of two flanged pipes. Fig. 3 is a section through the coupling, looking in the direction of the length of the wedges, the flanged pipes being shown in section at the coupling. The section is on line *x x*, Fig. 2. Fig. 4 is a plan of the coupling, showing one of the flanges of the pipe above the packing-ring. Fig. 5 is a detail, the parts being broken away, save sufficient to show the engagement of the wedges at one side of the coupling.

A indicates the socketed portion of the clamp. This socket is preferably a ring surrounding one of the pipes to be coupled, next to the flange M of said pipe. The socket A has an arm, B, at each side of and outside the pipe-flange, which arms B extend in the direction of the length of the pipe to be coupled. Each arm B has an inturned end, B', the under face of which is inclined or wedge-shaped, and preferably also undercut. (See Figs. 3 and 5.) The socket A has also an arm, C, shorter than the arms B and interposed between said arms. The arms B B C, when the socket A is applied to a pipe, will extend along the pipe and inclose the end flanges of the sections, (as M N,) but the inturned ends B' B' will extend under or beyond the flanges, as in Fig. 3. The yoke or horseshoe-shaped piece D has two arms, E E, which are thickened toward their ends, forming wedges of the same inclination as the wedge-faces of inturned ends B'. These wedges are preferably thickened at their outer edges. (See Fig. 3.) The yoke D has an arm, F, about at right angles with its body, and a set-screw, G, engages a thread in this arm. The socket A embraces pipe P just below the flange M, and a packing-ring, O, is applied to flange M. The pipe Q, having flange N, is then brought within the arms B B C, the arm C resting against one side of said flange N. The wedge-arms E E are passed under the inturned arms B' B', so that the inner end of screw G bears against arm C of socket A. When the parts are so assembled, the flat face of yoke D and arms E is next to flange N. By turning the screw G the arm C is forced to a firm bearing against one or both the flanges M N, thus centering the pipes, and at the same time the wedge action of arms E E against the bearings on B' B' will force the flanges of the two pipes firmly upon the elastic or compressible packing-ring O.

This coupling is specially adapted for coupling the flanged end of a lead or other service pipe to the flanged inlet of a water-closet bowl, as the pipe may be brought up toward the bowl in straight line, no turning of the pipe being necessary.

I claim—

1. The combination, with a flanged pipe-joint, of a socket embracing the flange, arms on the socket having inclines thereon, and a yoke having inclined or wedge-shaped arms engaging the flange of the joint and the inclines of the socket-arms, substantially as shown and set forth.

2. A pipe, as P, having a flange, a socket embracing said pipe next the flange, arms B B', having inclined projections and attached to said socket, arm C on the socket between the arms B B, yoke D, having wedge-arms E E and projection F, and screw G, passing through said projection and engaging arm C, all in combination, as set forth.

3. A pipe-coupling consisting, essentially, of a socket having arms provided with inclines, a yoke having wedges engaging said inclines, and a set-screw by which said wedges are forced in, the parts being and operating relatively to a pipe-joint substantially as described.

In testimony whereof I affix my signature in presence of two witnesses.

DAVID McKENZIE, JR.

Witnesses:
ROBERT LEITCH, Jr.,
W. A. BARTLETT.